United States Patent [19]

Epel et al.

[11] 4,067,845

[45] Jan. 10, 1978

[54] MATURATION OF POLYESTER COMPOSITIONS FOR VISCOSITY INDEX CONTROL

[75] Inventors: Joseph Norman Epel, Southfield; Vinod Chandulal Shah, Madison Heights; Kenneth Alfred Iseler, Richmond, all of Mich.

[73] Assignee: The Budd Company, Troy, Mich.

[21] Appl. No.: 638,701

[22] Filed: Dec. 8, 1975

[51] Int. Cl.$^2$ .................... C08K 3/22; C08K 5/20
[52] U.S. Cl. .................... 260/40 R; 260/40 TN; 260/858; 260/863; 260/865; 260/864
[58] Field of Search ............ 260/40 R, 863, 864, 260/865, 858, 40 TN

[56] References Cited

U.S. PATENT DOCUMENTS

| | | | |
|---|---|---|---|
| 2,568,331 | 9/1951 | Frilette | 260/865 X |
| 3,007,894 | 11/1961 | Bunge et al. | 260/858 X |
| 3,079,364 | 2/1963 | Schmidt | 260/864 X |
| 3,219,604 | 11/1965 | Fischer | 260/863 X |
| 3,288,735 | 11/1966 | Watanake et al. | 260/864 X |
| 3,431,320 | 3/1969 | Baum et al. | 260/865 |
| 3,789,030 | 1/1974 | Valgstadt et al. | 260/40 R |
| 3,789,037 | 1/1974 | Miller | 260/40 R |
| 3,824,201 | 7/1974 | McGranaghan et al. | 260/18 TN |
| 3,882,189 | 5/1975 | Hudak | 260/858 X |

Primary Examiner—Sandra M. Person
Attorney, Agent, or Firm—Gordon W. Hueschen

[57] ABSTRACT

The invention relates to improving the viscosity temperature dependence of a maturated moldable unsaturated polyester resin system, by utilizing a dual thickening system consisting of an oxide or hydroxide of magnesium or calcium and a polyisocyanate, which dual thickening system provides a greatly improved viscosity index, i.e., less viscosity decrease with increase in temperature, thereby providing substantial advantages upon being subjected to temperature increases such as are encountered in molding.

33 Claims, 1 Drawing Figure

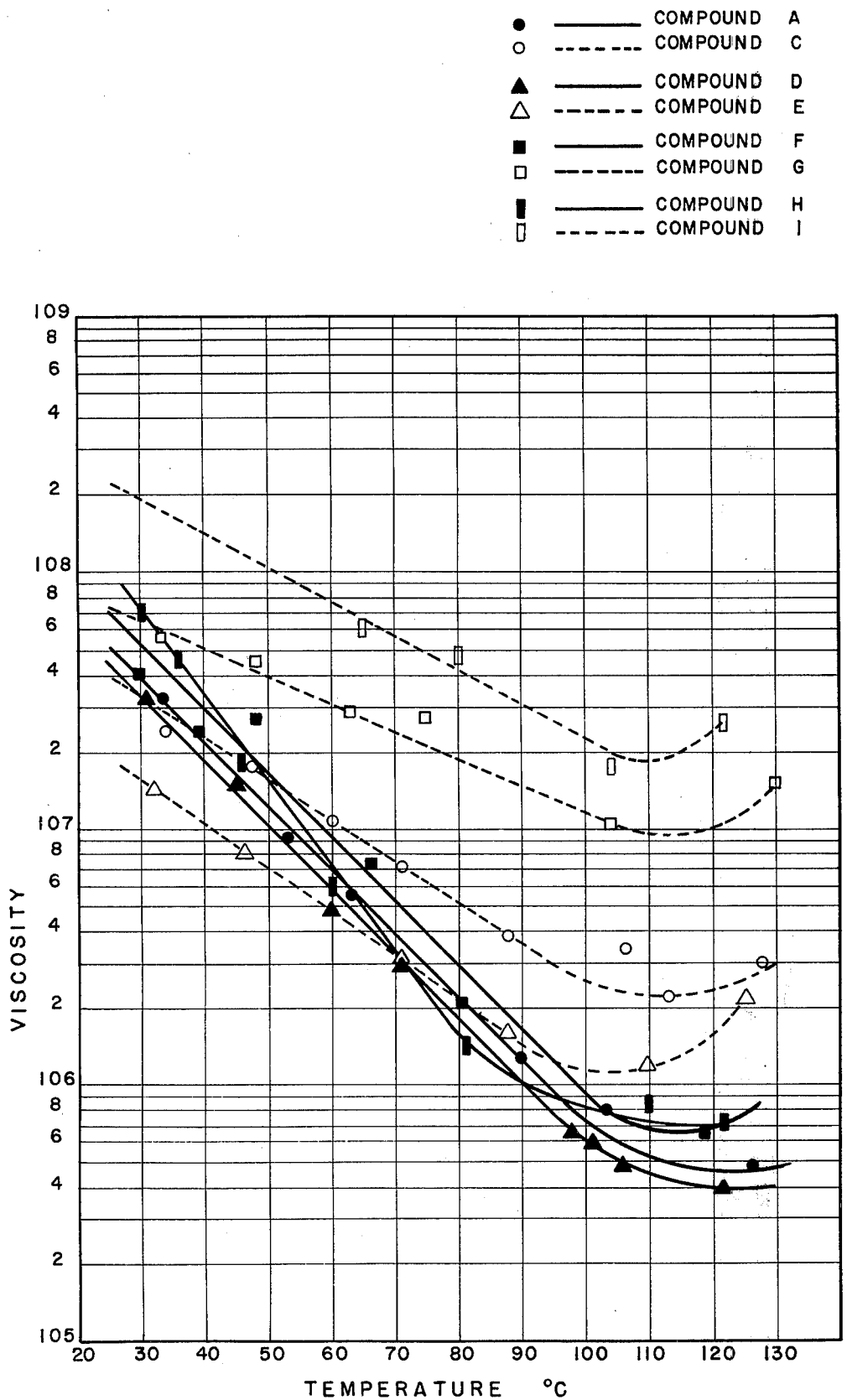

MATURATION OF POLYESTER COMPOSITIONS FOR VISCOSITY INDEX CONTROL

BACKGROUND OF THE INVENTION

1. Field of Invention

The present invention relates to maturated unsaturated polyester molding compositions or compounds, wherein the unsaturated polyester resin has both hydroxyl and carboxyl terminal groups present, comprising a dual thickening system of metallic oxides and hydroxides of calcium or magnesium and a polyisocyanate, the viscosity index, i.e., decrease in viscosity with increase in temperature, of which is reduced when compared to the same polyester matrix thickened with calcium or magnesium oxide or hydroxide alone, and which possess great advantage when compared to the same polyester matrix thickened with polyisocyanate alone. In fact, the desirable properties such as viscosity index, handleability, and slow initial viscosity rise attained in any particular polyester matrix of the invention is not achievable, so far as is known, with the same unsaturated polyester by using either metal oxide or hydroxide or polyisocyanate alone. Hereinafter polyisocyanate will refer to di, tri, or higher functionality isocyanates.

2. Prior Art

The rapid growth of molding compounds made from unsaturated polyester resins has been due in large part to the development of thickenable systems using metallic oxides or hydroxides. This development, first disclosed by Fisk in U.S. Pat. No. 2,628,209, consisted of adding a metallic oxide or hydroxide to an unsaturated polyester resin. Amounts of such metallic oxide or hydroxide thickening agents of between one hundred and two hundred percent, based upon the stoichiometric amount required for complete reaction with all carboxyl groups of the unsaturated polyester, are today conventional. This enabled the compounder to prepare bulk molding compounds (BMC) the initial viscosity of which was low, in order to minimize glass degradation in the double arm mixer during glass addition. After addition of the reinforcing agent, primarily chopped glass, the viscosity rise occurs on maturation, mainly 24 to 72 hours or longer; and at that point the molding compound had, at room temperature, a firm doughy consistency, was handleable without wetting the hands of the operator, and had sufficient viscosity to push the glass throughout the mold. The development of such thickening systems also permitted the development of sheet molding compounds (SMC), in which a filled or unfilled resin system with viscosities in the range of 600 to 50,000 centipoise could impregnate either a glass mat or the chopped glass in mat form and form a sheet consisting of intermixed resin matrix and glass. This material then could be subsequently maturated either at room temperatures or slightly higher temperatures to achieve viscosities at room temperature of the SMC matrix of somewhere between ten to one hundred million centipoise. The material in this form was handleable, could be slit, cut, rolled, or formed and could be added to the mold and had sufficient viscosity to push the glass ahead of it with the resin matrix.

However, BMC molding compounds made without the use of thickening agents, but using high surface fillers (such as asbestos) which greatly increase the viscosity of the resin, exhibit different flow characteristics than compounds whose initial viscosity is low and which are thickened through the use of metallic oxide or hydroxide. The difference in the flow of these two types of compounds has never readily been understood. An examination of the viscosity at elevated temperatures of molding compounds built with high clay loadings or clay carbonate-asbestos loadings, versus compounds made with carbonates which subsequently have been thickened with metallic oxides or hydroxides, indicates that compounds thickened thusly undergo radical viscosity decreases with rising temperature, whereas compounds which are thickened primarily through the use of high surface fillers exhibit a much lower decrease in viscosity.

The manufacturer of SMC molding compositions requires low initial viscosity of the SMC matrix to adequately wet out the glass; in the making of high quality BMC compounds, low viscosities are also desired in the mixer during glass addition. Therefore, the viscosity should not rise too rapidly initially, but high viscosity is required prior to molding to distribute the glass uniformly throughout the part being molded. The interest is not only in high viscosity at room temperature, but minimum decrease in viscosity at molding temperatures.

It quickly became apparent that $Mg(OH)_2$, MgO, CaO and $Ca(OH)_2$-thickened systems all possessed a similar temperature dependence. For example, a compound which had an initial maturated viscosity at room temperature of fifty million centipoise could drop down to viscosities on the order of two hundred thousand to four hundred thousand centipoise at molding temperatures, indicating an over one hundred-fold decrease in viscosity. Other methods of thickening polyester systems were accordingly investigated, including the use of polyisocyanate as sole thickening agent. However, the use of polyisocyanate as sole thickening agent is not satisfactory for the following reasons:

A. The isocyanate reacts rapidly with terminal hydroxylgroups, but slowly with carboxyl groups with evolution of $CO_2$. Most commercial unsaturated polyester resins have mixed terminal groups of both hydroxyl and carboxyl. Entrapment of gas formed by reaction of carboxyl groups and isocyanate results, with production of cheesy molding compounds that are difficult to handle, and produces undesirable surface properties in the ultimate molded product.

B. Unsaturated polyester resins with only hydroxyl terminal groups, or primarily hydroxyl terminal groups (as taught by McGranaghan, U.S. Pat. No. 3,824,201) are expensive to make, not generally available, and require large quantities of expensive polyisocyanate to achieve a tack-free handleable matrix. Initial viscosity rise is extremely rapid, causing glass wetout problems.

C. Unsaturated polyester resins with roughly equivalent hydroxyl to carboxyl ratios cannot be thickened solely with polyisocyanates to produce desirable molding compounds. At high polyisocyanate levels, reaction rates are high and sufficient $CO_2$ is liberated to form a crumbly matrix. At levels of polyisocyanate necessary to react only with the hydroxyl terminal groups, a tacky, soft, non-handleable matrix is obtained.

THE INVENTION

It has now been found that only through the use of a mixed thickening system, comprising calcium or magnesium oxide or hydroxide and polyisocyanate, can one obtain tack-free handleable matrix with a good viscosity index. The problem of $CO_2$ generation from the reaction of polyisocyanates with terminal carboxyl groups is minimized and, by using less than stoichiometric quantities of metallic oxides and hydroxides in combination with polyisocyanate, controlled reproducible thickening of standard commercially-available unsaturated polyester resins is obtained.

Our attempts to employ one hundred percent of stoichiometric amounts of metallic oxide necessary to react with all carboxyl groups together with a small amount of polyisocyanate produced no substantial improvement over the unsatisfactory results obtained using the metallic oxide or hydroxide alone. However, when we employed metallic oxide or hydroxide and polyisocyanate in the form of a dual thickening system in amounts of polyisocyanate sufficient to react with at least thirty percent of the hydroxyl groups, but not more than one hundred and five percent, preferably not more than ninety-five percent of the hydroxyl groups present, and an amount of metallic oxide or hydroxide sufficient to react with at least thirty percent of the carboxyl groups but not more than seventy-five percent of the carboxyl groups present, we found that the viscosity index was remarkably and even startlingly improved beyond that obtainable with any amount of the individual thickeners alone, while still maintaining the desirable characteristics of good fiber wetout. Molding compounds made with our dual thickening system yield molded parts with fewer voids, pits, and flow line cracks in addition to better glass distribution with resultant superior physical properties. Beyond the ranges mentioned, there appears to be no advantage in properties of the molding composition or molded products of the invention; and, above the highest percentages employed, there are, of course, decided economic disadvantages. The present invention preferably does not employ greater than ninety-five percent of the stoichiometric amount of polyisocyanate, although as much as one hundred and five percent of stoichiometric can, in some cases, be employed, along with relatively high proportions of metallic oxide or hydroxide, with retention of the advantages of the invention, since the metallic oxide or hydroxide reduces the foaming effect, improves handleability, and overcomes the necessity of the larger quantities of polyisocyanate due to a competitive reaction with the carboxyl groups present. Moreover, according to the present invention, the amount of metallic oxide or hydroxide thickening agent employed does not exceed seventy-five percent of the stoichiometric amount necessary to react with all of the carboxyl groups present, although this amount may be as low as thirty percent, as when approximately ninety-five percent of the stoichiometric amount of polyisocyanate is present based on the available hydroxyl groups. Good viscosity indices are obtained at approximately seventy percent metallic oxide or hydroxide and seventy percent of the polyisocyanate, respectively representing percentages of the stoichiometric amounts required for reaction with all reactive carboxyl and all hydroxyl groups present, and exceptional improvements in viscosity indexes are realized when these percentages are respectively about fifty to seventy percent of the polyisocyanate to approximately forty to sixty percent of the metallic oxide or hydroxide, in each case such percentage being based upon the stoichiometric amounts required for reaction with all hydroxyl groups and all carboxyl groups respectively. Thus, the method of the present invention permits attainment of highly desirable and previously unattainable characteristics in the maturated and moldable compositions of the invention and in the final molded products made therefrom by taking a direction contrary to that indicated by the prior art and dropping the amount of metallic oxide or hydroxide from one hundred to two hundred percent down to a maximum if seventy-five percent of the stoichiometric for carboxyl and by employing it together with the polyisocyanate in amounts which are not capable of producing useful molding compositions when employed by itself as sole thickening agent for molding compositions embodying relatively high carboxyl content unsaturated polyesters, which are commonly and economically commercially-available today and which are employed as the main ingredient of the curable resin binders in the molding compositions of the present invention. Thus, according to the present invention, the following advantages are attained: because of the improved viscosity index, lower room temperature viscosities are possible and, therefore, lower molding pressures are possible. Since the viscosity holds up at molding temperatures, there is good distribution of glass throughout the molding compound, flashing is less severe or non-existent, and porosity, pit, and flow lines are greatly reduced or eliminated. These advantages are all possible due to the smaller drop in viscosity at molding temperature of the molding compositions of the present invention. In addition, as previously stated, the molded products produced from the maturated and moldable compositions of the present invention appear to be characterized by more uniform physical properties. The attainment of the foregoing advantages is among the objectives of the present invention, but additional objectives will become apparent hereinafter and still others will be obvious to one skilled in the art.

THE DRAWING

Referring now to the drawing, the single FIGURE shows a series of curves obtained by plotting the viscosity of certain compositions (taken from the Examples hereinafter) embodying the dual thickening system of the invention and their counterpart systems embodying the conventional magnesium oxide or magnesium hydroxide thickener, the viscosity being plotted against temperature. These curves dramatically illustrate the effect of the dual thickening system of the invention in providing an improved viscosity index, that is, the slope of the viscosity-temperature curves for the compositions of the invention, shown by the broken lines and the open symbols, is much less than the slope of the viscosity-temperature curves for the corresponding system thickened with conventional MgO or Mg(OH)$_2$ thickeners. It is to be noted that, although Compound D begins with a higher viscosity at room temperature, it ends up with a lower molding temperature viscosity than Compound E, which is the corresponding composition embodying the dual thickening system of the present invention.

SUMMARY OF THE INVENTION

The present invention consists of a maturated moldable thermosetting resin-containing composition for molding under pressure at an elevated temperature in which the curable resin system consists essentially of (A) an unsaturated polyester resin having (1) a ratio of hydroxyl groups to carboxyl groups between 5.7 and 0.8 and (2) an acid number of at least 14 and (3) an average molecular weight between about 800 and 5,000, and (B) (1) an organic polyisocyanate in an amount sufficient to react with at least thirty percent, but not more than one hundred and five percent of the hydroxyl groups present, and (B) (2) a metallic oxide or hydroxide selected from the group consisting of calcium and magnesium oxides or hydroxides in an amount to react with at least thirty percent but not more than seventy-five percent of the carboxyl groups present, said reaction product containing dispersed therein (C) an aliphatically unsaturated monomer, (D) a free radical polymerization catalyst, (E) an internal mold release agent and either or both of (a) reinforcing fibers and (b) inert fillers. In addition, the inclusion of (F) thermoplastic additives for low-shrink control is an optional part of this invention. The invention also contemplates a method of producing a controllable rise in viscosity and an improved viscosity index of an uncured polyester conpound, or to prepare a molding compound having a controllable rise in viscosity and an improved viscosity index, wherein the compound comprises (A), at least one (C), and (D), all as above-defined, by introducing into the polyester resin compound reaction mixture prior to curing both (B) (1) and (B) (2), also as above-defined.

DETAILS OF THE PRESENT INVENTION

The present invention encompasses a maturated moldable thermosetting resin-containing composition for molding under pressure at an elevated temperature, and the several methods just referred to in the foregoing.

This thermosetting composition consists essentially of the following ingredients: (A) a thermosetting unsaturated polyester resin, (B) a dual thickening system, (C) an aliphatically unsaturated monomer, (D) a free radical polymerization catalyst, (E) an internal mold release agent, and either or both of (a) reinforcing fibers and (b) inert fillers, and may in addition contain (F) a thermoplastic additive to produce molding compositions with low-shrink characteristics. According to the method of the invention, items (E), (a), and (b) are optional but usual ingredients, whereas (F) is also an optional but less usual ingredient. The components (A) and (B), containing dispersed therein (C), (D) and (E), constitute the curable resin binder which generally comprises at least about eight percent, and generally at least about ten percent, of the total weight of said composition.

(A) Unsaturated Polyester Resin

The unsaturated polyester resin employed according to the present invention has (1) ratio of hydroxyl groups to carboxyl groups between about 5.7 and 0.8 and (2) an acid number of at least 14 and (3) an average molecular weight between about 800 and 5,000. The resin preferably has an acid number of at least 14 and a hydroxyl number of at least 14, preferably 14–120, and preferably an acid number between about 14 and about 70. Said resin preferably has a molecular weight of about 900 to 3,500. The resinous condensation product is ordinarily dissolved in an aliphatically unsaturated monomer, such as styrene, (reactant C herein) prior to use in the process of the invention.

Although innumerable unsaturated polyesters may be employed as starting materials according to the present invention, three types are used to further explain the invention. These will be disclosed in greater detail hereinafter.

A. Glycol Maleate Type

This type of starting unsaturated polyester is a butylene, propylene, or ethylene glycol maleate polyester product, and may contain small quantities of other glycols, for example diethylene or dipropylene glycol, neopentyl glycol, or the like. Such products are prepared, for example, by cooking together one mole of maleic acid or anhydride, one mole of propylene glycol, 0.1 mole of ethylene glycol, an esterification catalyst and tertiary butyl catechol or hydroquinone inhibitor. Such polyesters have the properties of high rigidity, high heat resistance, and are highly reactive and readily made into low-shrink compositions by the incorporation thereinto of a thermoplastic resin.

B. Glycol Maleate Phthalate Type

This type of starting unsaturated polyester is prepared from propylene or ethylene glycol, maleic acid or anhydride, and phthalic or isophthalic acid, plus miscellaneous other glycols as set forth under A in the foregoing. The ratio of maleate to phthalate is about 3:1. Such products are representatively prepared by cooking together, for example, 0.75 mole of maleic acid or anhydride, 0.25 mole of isophthalic acid, and 1.1 mole of propylene glycol. Such type unsaturated polyesters have the properties of being slightly more resilient than type A, stronger than type A, have a slightly lower heat resistance than type A, and are slightly less reactive than type A.

C. Glycol Maleate Phthalate-Higher in Phthalate

This type of unsaturated polyester is prepared from ethylene glycol or propylene glycol, maleic acid or anyhydride, and isophthalic acid, plus miscellaneous other glycols as in A, the maleate-phthalate ratio in this case being about 2:1. Preparation is effected in substantially the same manner as given in the foregoing for Type B. Such type resins are characterized by extreme toughness, higher elongation, low heat distortion, and a lower reactivity.

Aside from the characteristics of the unsaturated polyester resin set forth in the first paragraph under this heading, the exact type of unsaturated polyester resin employed is not critical, as previously stated. The polyester resins are well known and are conventionally made by the condensation of at least one unsaturated dicarboxylic acid or anhydride and at least one glycol wherein water is removed during the condensation-esterification reaction. Examples of suitable unsaturated dicarboxylic acids include alpha, beta ethylenically unsaturated dicarboxylic acids and their anhydrides such as fumaric acid, maleic acid, and maleic anhydride. Examples of saturated polycarboxylic acids and their anhydrides include the phthalic acids, phthalic anhydride, succinic acid, adipic acid and itaconic acid. Other polycarboxylic acids usable herein include citric acid, pyromellitic acid and trimesic acid. The preferred glycols usable herein to make the polyester resin are the alkylene glycols such as ethylene glycol, propylene glycol, neopentyl glycol, butylene glycol, and bisphenol A, all as is well known in the art. Either the dicarboxylic acids or the glycols may be halogenated to reduce the flammability of molded articles.

The acid numbers and the hydroxyl numbers employed hereinbefore and in the claims refer to the unsaturated polyester (A) itself. It will accordingly be understood that these figures are somewhat higher than in the Examples where hydroxyl and carboxyl numbers are given for the polyester resin dissolved in styrene monomer.

Organic Polyisocyanate (B) (1)

According to the present invention, the organic polyisocyanate employed is employed in an amount sufficient to react with at least thirty percent but not more than one hundred five percent of the hydroxyl groups present in the reaction. The polyisocyanate (B) (1) is preferably 4,4'-diphenylmethane diisocyanate (MDI) or a mixture of MDI and its trifunctional cyclic adduct containing carbodiimide linkages. The exact polyisocyanate employed is not critical, but diisocyanates are preferred. Common representative polyisocyanates include: toluene-2,4-diisocyanate; toluene-2,6-diisocyanate, commercial mixtures of 2,4- and 2,6-toluene diisocyanate, the meta- and para-phenyl diisocyanates, 1,5-naphthalene diisocyanate, para- and meta-xylylene diisocyanates, the alkylene diisocyanates such as tetramethylene diisocyanate and hexamethylene diisocyanate, 2,4- and 2,6-diisocyanato methylcyclohexane, dicyclohexylmethane diisocyanate, and polymeric MDI containing an average of from two to three isocyanate groups per molecule. Other polyisocyanates which may be employed include polyisocyanurate of toluene diisocyanate, polymethylene polyphenyl isocyanate, polyisocyanate prepolymers of aromatic type, toluene diisocyanate-based adducts, aromatic/aliphatic polyisocyanates, and polyfunctional aliphatic isocyanates.

Metallic Oxide or Hydroxide (B) (2)

The metallic oxide or hydroxide (B) (2) according to the present invention is selected from the group consisting of calcium and magnesium oxides and hydroxides and is employed in an amount sufficient to react with at least thirty percent but not more than seventy-five percent of the carboxyl groups present in the reaction. The choice of metallic oxide or hydroxide is a matter of individual preference, and depends inter alia upon the particular polyester resin used and the exact manufacturing procedure employed for producing the molding composition, as is well known to one versed in the art.

Aliphatically-unsaturated Monomer (C)

According to the invention, the reaction product, unsaturated resin A, is mixed with (C) a co-polymerizable aliphatically-unsaturated monomer. The aliphatically-unsaturated monomer (C) is ordinarily present in an amount to give 0.5 to 2.5 moles of monomer unsaturation per mole of unsaturation in resin (A). Styrene and vinyl toluene are preferred aliphatically-unsaturated monomers, although others may be employed.

Free Radical Polymerization Catalyst (D)

According to the invention, the reaction product also contains therein a free radical polymerization catalyst (D). The catalyst (D) is preferably present in an amount of at least 0.1 part per 100 parts of total resin (A) and monomer (C), the parts being by weight.

Such a free radical polymerization catalyst is added to the uncured composition so that, upon heating to the catalyst activation temperature, the addition-type crosslinking polymerization reaction will commence between the polymerizable monomer and the unsaturated polyester resin. Such catalyst is usually used in an amount in the range of about 0.1 to 3.0 parts per 100 parts of total monomer and resin. As is well-known in the art, a wide range of free radical generating polymerization catalysts are usable, such as lauroyl peroxide, benzoyl peroxide, parachlorobenzoyl peroxide, and 2,4-dichlorobenzoyl peroxide, ketone peroxides such as methyl ethyl ketone peroxide, cyclohexanone peroxide, methyl isobutyl ketone peroxide, and others including dicumyl peroxide, 2,2'-bis(4,4'-ditertiary butyl peroxy cyclohexyl propane), ditertiary butyl peroxide, cumene hydroperoxide, tertiary butyl cumyl peroxide, and tertiary butyl perbenzoate.

Internal Mold Release Agent (E)

Internal mold release agents such as zinc stearate, calcium stearate, magnesium stearate, organic phosphate esters, and other organic liquid internal mold release agents may be employed, as is well known in the art.

Reinforcing Fibers (a)

In the composition of the invention, the fiber reinforcement, may be present in an amount of about 5 to about 25 weight percent for bulk molding compositions and about 10 to 70 weight percent for sheet molding compositions. The fiber employed is preferably fiberglass. The amount of reinforcing fiber is preferably about 25-70 wt/pct for SMC.

A wide variety of reinforcing fibers are available for use herein to form the sheet molding compound and bulk molding compound such as glass fibers, carbon fibers, sisal fibers, kevlar fibers, asbestos fibers, cotton fibers, and other fibers such as steel fibers and whiskers, boron fibers and whiskers, and graphite fibers and whiskers. In addition, a wide variety of organic fibers may be used. Glass fibers are the most desirable fibers for most applications because of their low cost and high strength.

Non-Reinforcing Fillers (b)

Fillers may be, if desired, and generally are added to the uncured composition to reduce overall material costs without sacrificing a significant degree of desirable physical properties in the final product or to impart specific properties to the compound. Many different types of fillers can be used, such as inorganic fillers, e.g., silicate, asbestos, calcium carbonate, mica, barytes, clay, diatomaceous earth, microballoons, microspheres, silica, and Fullers earth; and inorganic fillers, such as wood flour, cork dust, cotton flock, wool felt, shredded cornstalks, and ground nut shells. For example, these fillers may be added in amounts ranging from about twenty parts to one thousand parts by weight per one hundred parts of the pure polyester resin. When used alone without reinforcing fiber, the filler is employed in an amount of about fifty to about eighty weight percent for bulk molding compositions.

Low-Shrink Additive (F)

The molding compositions of the invention may include (F), a low-shrink additive consisting essentially of a thermoplastic polymer, ordinarily added dissolved in styrene or other unsaturated monomer (C), said low-shrink additive preferably being present in an amount of about ten to fifty-five parts by weight per one hundred parts of resin (A). This low-shrink additive, when optionally employed, is generally added to the combination of the unsaturated polyester resin and the ethylenically unsaturated polymerizable liquid monomer, and may be in the form of a thermoplastic powder solubilized in part or all of the polymerizable liquid monomer employed. Such low-shrink thermoplastic based additives are described in U.S. Pat. No. 3,701,748 and the low-shrink technology is also described in British Patent Specification Nos. 1,201,087 and 1,201,088, the disclosures of which three patents are hereby incorporated by reference. Such incorporation of low-shrink additive technology is now well-established in the art. The disclosures of Kroekel U.S. Pat. No. 3,701,748 is of interest regarding useful resins (A) and aliphatically-unsaturated monomers (C), but is particularly apt as far as its disclosure of useful thermoplastic polymers or copolymers (F) which may be employed to obtain low-shrink characteristics, except that for purposes of the present invention it is not necessary that such thermoplastic polymer or copolymer (F) be of a nature which yields an optically heterogeneous cured composition.

Polymerization Inhibitor

In some of the Examples, inhibitors were used and the normal free radical initiators were omitted to enable one to make viscosity measurements over the entire temperature range to illustrate the efficacy of the dual thickening system at molding temperatures. In practice, the quantity of inhibitors present in commercial polyester resins is such that additional inhibitor is not required. As is conventional, free radical catalysts are added to effect the cure.

In General

In general, the starting unsaturated polyester is dispersed in the aliphatically-unsaturated monomer. A suitable internal lubricant, such as zinc stearate, and a suitable amount of free radical catalyst, such as a peroxide, are introduced into the mixture. Optional ingredients include inorganic filler such as calcium carbonate, thermoplastic resin for low shrink, and pigment for coloration. Immediately prior to adding the reinforcing fiber, the dual thickener of the present invention is added thereto. Preferably the two thickeners employed according to the present invention are not admixed together before adding to the resin matrix, as this may result in some reduction in effectiveness. The dual thickener system has been developed to restrict the rise in the viscosity of the resin matrix until sufficient time has been allowed for good wetting of the reinforcing fiber. After the wetting out period the viscosity rises and maturation, i.e., rise in viscosity to a hardenable state, takes place to yield a compound of proper viscosity and handleability at room temperature and sufficient viscosity at elevated molding temperatures. The thus-filled and maturated molding composition is then molded under conditions of increased heat and pressure, to produce the desired molded product.

Ordinarily, the initial mixture, prior to impregnation of the fiberglass, but without added thickener, has a modest shelf life, with a stability which may extend for a period of months. However, after introduction of the dual thickener to this mixture, there is a short period of time in which viscosity does not rise significantly. During this period of time, the resin matrix can impregnate and wet-out the glass or fiber before maturation begins, and viscosity increases rapidly. When the glass or the fiber is subjected to this thickening mixture, and the mixture including the fibers allowed to stand for purposes of further increasing the viscosity and wetting the fibers, a molding compound or composition is produced. This is again a relatively stable composition which, after attaining its increased viscosity, can remain stable for an extended period, again up to several months. The molding composition or compound may be subjected to the usual molding procedure under conditions of increased heat and pressure, and all of the foregoing is fundamentally well-established in the prior art.

The important aspect of the present invention is that, upon addition of the mixed thickening system of the invention to the original mixture prior to impregnation of the glass or other fibers, a sufficient induction period is afforded to complete an adequate wetting of the fibers and that, when the maturated molding compound or composition is subjected to the conditions of increased heat and pressure during the molding operation, a relatively high viscosity is maintained even at the elevated temperatures and pressures encountered during molding. This is of great advantage, in that voids and porosity in the molded product are avoided, and that checking and other surface imperfections are eliminated, while at the same time excellent distribution of the fiber throughout the molded product is obtained. This maintenance of a relatively high viscosity at elevated temperatures has not been hitherto available through the employment of conventional thickening agents.

As already stated, the two thickeners employed according to the invention are preferably not admixed together before adding to the polyester resin or the dispersion thereof in the aliphatically unsaturated monomer. However, preferably simultaneously or as soon as possible after introduction of the last of the two thickeners into the polyester or polyester dispersion, which is usually the polyisocyanate, the aforementioned polyester resin compound is usually brought into intimate contact with a mass of reinforcing fibers. This simultaneity is desirable, but less essential than previously, when employing the compositions of the present invention, so that the uncured resin and other constituents wet the surface of the individual fibers before the resin starts to maturate. This technique provides the best possible bonding environment between the reinforcing fibers and the cured polyester resin.

The reinforcing fibers can be in the form of woven or nonwoven cloths or batts or in the form of bulk fibers either continuous or chopped. In the manufacturing of SMC the fibers and resin matrix and the fibers and resin compound are processed under sufficient pressure to form an intimate dispersion of both components without gross breakage of the individual fibers, and this dispersion is then formed into a thin sheet. This is commonly done in a special machine that chops long strands of reinforcing fibers into short staple fibers, intimately mixes them with the dual-thickener-containing polyester resin composition and subsequently forms this fiber-containing mixture into a sheet or thin layer. As the newly formed sheets of wet mixture are extremely tacky, they are often covered on both sides with a thin, relatively nonporous film such as polyethylene film or polypropylene film and rolled up or otherwise stored for a sufficient length of time to permit maturation to take place. This may be from a few hours to several days and twenty-four to seventy-two hours is not an uncommon or unreasonable time for maturation, during which time the stability and shelflife of the composition once again stabilizes, as already noted.

Upon completion of maturation, the sheet may be unrolled and the nonporous films stripped away to reveal a nontacky, rather flexible sheet of fiber containing thickened but not crosslinked polyester resin that is ready to be cut into a desired outline and stacked in layers in a compression molding press where it will be pressed into the desired configuration and heated to activate the free-radical generating catalyst to begin the crosslinking reaction between the polymerizable monomer and the unsaturated polyester resin. This maturation of the unsaturated polyester resin composition takes place with the composition still in the uncured state. The uncured or uncrosslinked polyester resin composition generally comprises a homogeneous blend of an unsaturated polyester resin with various other constituents as previously described and the background of which is generally found in U.S. Pat. No. 3,701,748. This maturation is generally conducted at room temperature or slightly above, according to the by now well-established skill of the art.

The maturated resin molding compound of this invention can be in the form of a bulk molding compound (BMC) or in the form of a sheet molding compound (SMC) as these compounds and other similar compounds are contemplated herein. BMC and SMC compounds are explained in detail in U.S. Pat. No. 3,536,642. In some portions of the world, bulk molding compounds (BMC) are referred to as dough molding compounds or DMC.

Generally speaking, in the molding of SMC compounds a plurality of sheets of SMC compound are cut to the general outline of the article to be molded, are stacked in a predetermined number of layers, and are inserted into the cavity of a compression molding machine. The machine is closed to form the layers into the desired configuration, and the layers are heated therein so that the thermosetting resin will crosslink and form a solid article, the crosslinking taking place through the aliphatic unsaturation in the polyester. Examples of articles made by this technique include automobile body parts, appliance housings, furniture elements, tables and chairs, and luggage. Generally they comprise a cured polyester resin compound having at least one exposed surface. The maturated compounds of this invention when used in molding flow properly into the mold and maintain the desired dispersion of fibers and/or fillers during both mold-filling operation and the curing cycle to produce articles that are characterized by excellent internal strength as well as excellent surface quality and a high degree of adhesion between the exposed surface of the article and an overlying paint or other covering film applied thereto. These aspects are extremely important for articles encountering rather severe environments such as automobile exterior components, e.g., fenders, hood, grill opening panels, and fender extensions that are exposed to not only varying temperatures and degrees of humidity but flying debris such as dust particles, sand, grit, and the like.

The unsaturation in the initial dicarboxylic anhydride or acid carried over into the unsaturated polyester resion produced by the initial esterification reaction is utilized in crosslinking and curing the unsaturated polyester molecules with and through an ethylenically unsaturated polymerizable liquid monomer such as styrene or vinyl toluene in a free-radical, addition-type curing reaction along the lines fully described in U.S. Pat. No. 3,701,748, this crosslinking and curing taking place during the molding operation in which the composition or molding compound is heated and subjected to pressure so that curing or crosslinking and formation of a solid article will occur. As previously noted, this crosslinkage and solidification of the thermosetting resins present in the molding compositions of the invention takes place through the aliphatic unsaturation in the polyester and the ethylenically unsaturated polymerizable liquid monomers.

DESCRIPTION OF THE PREFERRED EMBODIMENTS

The following Examples are given by way of illustration only, and are not to be construed as limiting.

Experimental work was performed on samples containing no catalyst and free-radical inhibitor to avoid the complication of polymerization during measurements at elevated temperatures. In actual practice in molding compounds, catalysts are present, but the phenomena of heating of the molding compound in contact with a metal mold is very rapid so that essentially the material will be attaining the viscosities in the neighborhood measured without catalyst prior to any appreciable amount of polymerization taking place. In actual experience, molding compounds made with dual thickening systems and containing catalysts exhibited the predicted properties of good distribution of glass fibers, minimum porosity, and absence of flow line cracks.

EXAMPLE I

An unsaturated polyester resin herein designated (1) is formed by reacting 1.00 mole of propylene glycol, 0.1 mole of diethylene glycol, and one mole of maleic anhydride. The esterification was carried out at 190° C. The final resin had an Acid Value of 23.9, a hydroxyl value of 35.8, and a molecular weight of 1880.

This resin was dissolved in styrene to yield a solution of unsaturated polyester resin in styrene which is designated resin (2) and had an Acid Value of 16 and a hydroxyl number of 24.

(b)
Utilizing Resin (2), formulations representing SMC low-shrink matrices were made on which the type of thickening was varied. Compound A represents a conventional metal hydroxide thickened system. Its viscosity index was poor. Compound B had sufficient polyisocyanate to react with most of the terminal hydroxyl groups. It was not handleable. Compound C represents the novel dual thickening system of the invention, in which polyisocyanates are used to react primarily with terminal hydroxyl groups together with metal oxides or hydroxides to react primarily with terminal carboxyl groups. In four days, Compounds A and C thickened to dry, tack-free handleable solids. Compound B was a tacky semi-solid, which could not be used for SMC formulations. The viscosity index of C was excellent. The viscosity of C at 30° C is slightly lower than the viscosity of A; however, at 120° C the viscosity of compound C was almost 6 times greater than A. In these examples, the term viscosity index will refer to the ratio of viscosity at 30° C to that at 120° C. From this it follows, the higher the viscosity number, the poorer the compound for our purposes.

|  | Compound A | Compound B | Compound C |
| --- | --- | --- | --- |
| Resin (2) | 60 | 60 | 60 |
| Acrylic Syrup * | 40 | 40 | 40 |
| Zinc Stearate (lubricant) | 2.7 | 2.7 | 2.7 |
| Calcium Carbonate (filler) | 150 | 150 | 150 |
| Hydroquinone (10% in ethylene glycol) | 0.15 | 0.15 | 0.15 |
| Mg(OH)$_2$ | 1.40 | — | 0.58 |
| Polyisocyanate ** | — | 3.05 | 1.71 |
| Mg(OH)$_2$ % of Stoichio- | | | |

|  | Compound A | Compound B | Compound C |
|---|---|---|---|
| metric (COOH) | 169% | — | 70% |
| Isocyanate % of Stoichiometric (OH) | — | 95% | 53% |
| Viscosity at 30° C. | $38.5 \times 10^6$ | — | $32.6 \times 10^6$ |
| Viscosity at 120° C. | $.46 \times 10^6$ | — | $2.3 \times 10^6$ |
| RATIO $\frac{\text{Viscosity at 30° C.}}{\text{Viscosity at 120° C}}$ = | 80 | liquid paste (not handleable) | 14 |

*P-701 (TM). Solution of 33% polymethacrylate in styrene monomer. The polymethacrylate employed was a copolymer primarily consisting of polymethylmethacrylate and containing a small amount (nine to ten percent by weight) of ethylacrylate which was copolymerized with the methylmethacrylate.
**MDI; 4,4'-diphenyl methane diisocyanate

EXAMPLE II

A Type B resin, comprising a glycol maleate phthalate, designated herein as Resin (3), was used to prepare SMC matrices.

Resin (3) contains 45% styrene monomer, 55% unsaturated glycol-maleate-isophthalate polyester resin (Glidden-Durkee 4329(TM)), and has an Acid Value of 11, a Hydroxyl Number of 21, and a molecular weight of about 1928. The following mixes were made to compare SMC matrices thickened with $Mg(OH)_2$ versus those thickened with mixed $Mg(OH)_2$-polyisocyanate.

|  | Compound D | Compound E |
|---|---|---|
| Resin (3) | 100 | 100 |
| Zinc Stearate (lubricant) | 2.7 | 2.7 |
| Calcium Carbonate (filler) | 150 | 150 |
| Hydroquinone (10% in ethylene glycol) | 0.15 | 0.15 |
| $Mg(OH)_2$ | 1.4 | .39 |
| Polyisocyanate (Isonate 143L(TM) - a liquid equilibrium mixture of MDI and its cyclic adduct containing carbodiimide linkages - Upjohn) | — | 1.95 |
| $Mg(OH)_2$ % of Stoichiometric (COOH) | 246% | 68% |
| Isocyanate % Stoichiometric (OH) | — | 37% |
| Viscosity at 30° C. | $33 \times 10^6$ | $15.4 \times 10^6$ |
| Viscosity at 120° C. | $0.4 \times 10^6$ | $1.6 \times 10^6$ |
| RATIO $\frac{\text{Viscosity at 30° C.}}{\text{Viscosity at 120° C.}}$ | 82.5 | 20.6 |

Both Compounds D and E thickened to tack-free handleable matrices in four days time. Compound D had an unsatisfactory viscosity index, less than one-fourth as acceptable as that of Compound E. Compound E has less than one-half the viscosity of Compound D at 30° C., but four times the viscosity at 120° C. Thus, according to the invention, softer SMC compound can be made which still possesses a sufficiently high viscosity at molding temperatures to distribute the glass uniformly.

In Compound E, the amount of isocyanate used was 37% of the stoichiometric quantity required to react with the terminal hydroxyl groups and the amount of $Mg(OH)_2$ was 68% of the stoichiometric quantity required to react with the terminal carboxyl groups. The viscosity index for Compound E was good.

EXAMPLE III

A Type B resin, comprising a glycol maleate isophthalate, designated as Resin (4), was used to prepare SMC matrices.

Resin (4), a glycol maleate isophthalate type (Stypol 40 — 2982(TM) — Freeman Chemical), contains 27% styrene monomer and 73% unsaturated polyester resin, and has a molecular weight of 960, an Acid Value of 16, and an OH value of 69. Resin (4) was evaluated using a conventional thickening agent, compared with Resin (4) thickened with the dual thickening system of the invention.

|  | Compound F | Compound G |
|---|---|---|
| Resin (4) | 60 | 60 |
| Acrylic Syrup (P-701; TM) | 40 | 40 |
| Zinc Stearate (lubricant) | 2.7 | 2.7 |
| Calcium Carbonate (filler) | 150 | 150 |
| Hydroquinone (10% in ethylene glycol) | 0.15 | 0.15 |
| MgO | .81 | .33 |
| Polyisocyanate (Isonate 143L;TM) | — | 9.87 |
| MgO % of Stoichiometric (COOH) | 142% | 58% |
| Isocyanate % of Stoichiometric (OH) | — | 93% |
| Viscosity at 30° C. | $52 \times 10^6$ | $65 \times 10^6$ |
| Viscosity at 120° C. | $.61 \times 10^6$ | $10.1 \times 10^6$ |
| RATIO $\frac{\text{Viscosity at 30° C.}}{\text{Viscosity at 120° C.}}$ | 85.2 | 6.4 |

In Compound F, an excess of MgO, which was 142% of the stoichiometric, was used to thicken. The viscosity index was unsatisfactory. In Compound G, the MgO was 58% of the stoichiometric for carboxyl groups and the isocyanate was 93% of the stoichiometric for the hydroxyl groups. The viscosity index of Compound G was excellent, more than thirteen times as acceptable as that of Compound F.

EXAMPLE IV

A type C resin, comprising a glycol maleate isophthalate polyester resin, designated as Resin (5), was used to prepare SMC matrices. Resin (5) was used to compare SMC matrices thickened with a combination of MgO and polyisocyanate. Resin (5) (Stypol 40 — 2353 (TM) — Freeman Chemical) contains 29% styrene monomer and 71% of an unsaturated polyester resin with a molecular weight average of 1990. The Acid Value of Resin (5) is 13.6, the OH value is 26.2, and the molecular weight is about 1970.

|  | Compound H | Compound I |
|---|---|---|
| Resin (5) | 58.18 | 58.18 |
| Acrylic Syrup (P-701;TM) | 41.82 | 41.82 |
| Zinc Stearate (lubricant) | 2.7 | 2.7 |
| Calcium Carbonate (filler) | 150.0 | 150.0 |
| Hydroquinone (10% in ethylene glycol) | 0.15 | 0.15 |
| MgO (Mod-M; TM - 33% MgO dispersed in an inert carrier) | 2.83 | 1.10 |
| Polyisocyanate (Isonate 143L;TM) | — | 4.04 |
| MgO % of Stoichiometric (COOH) | 187% | 72% |
| Isocyanate % stoichiometric (OH) | — | 103% |
| Viscosity at 30° C. | $70.2 \times 10^6$ | $190 \times 10^6$ |
| Viscosity at 120° C. | $.72 \times 10^6$ | $26 \times 10^6$ |
| RATIO $\frac{\text{Viscosity at 30° C.}}{\text{Viscosity at 120° C.}}$ = | 98 | 7.31 |

Even though high quantities of MgO and dual thickening mixtures were used, the same viscosity index rule applied.

Compound H, which had a room temperature viscosity of $70 \times 10^6$, at 120° C. had a viscosity of only $0.72 \times 10^6$ or a ninety-eight-fold decrease.

Compound I, which had a high level of dual thickener, had a viscosity of $190 \times 10^6$ at 30° C. and a viscosity of $26 \times 10^6$ at 120° C. Its viscosity index was far superior to that of Compound H.

EXAMPLE V

Using Resin (6) and comparing MgO as sole conventional thickening agent, corresponding improvements of the dual system of the present invention are illustrated. Compounds J and K are low-shrink systems, while L and M are conventional SMC matrices. Resin (6) is a type A resin, being a propylene glycol maleate containing a small proportion of ethylene glycol, having an Acid Number of 16, a Molecular Weight of about 1880, diluted to 67% gum and 33% styrene monomer (Marco G-13021;TM).

| | Compound J | Compound K | Compound L | Compound M |
|---|---|---|---|---|
| Resin (6) | 58.15 | 58.18 | 100 | 100 |
| Acrylic Syrup (P-701;TM) | 41.82 | 41.82 | — | — |
| Zinc Stearate (lubricant) | 2.7 | 2.7 | 2.7 | 2.7 |
| Calcium Carbonate (filler) | 150 | 150 | 150 | 150 |
| Hydroquinone (10% in Ethylene Glycol) | .15 | .15 | .15 | .15 |
| MgO (Mod-M;TM) | 2.8 | 1.14 | 2.8 | 1.14 |
| Polyisocyanate (Isonate 143L) | — | 3.00 | — | 5.00 |
| MgO % of Stoichiometric (COOH) | 164% | 67% | 164% | 67% |
| Isocyanate % Stoichiometric (OH) | — | 83% | — | 82% |
| Viscosity at 30° C. | $90 \times 10^6$ | 43.5 | $46 \times 10^6$ | $15.2 \times 10^6$ |
| Viscosity at 120° C. | $.846 \times 10^6$ | 1.61 | $.4 \times 10^6$ | $.365 \times 10^6$ |
| Ratio $\frac{\text{Viscosity at 30° C.}}{\text{Viscosity at 120° C.}} =$ | 106 | 27.0 | 115 | 41 |
| | About four times as acceptable a viscosity index. | | About three times as acceptable a viscosity index. | |

EXAMPLE VI

| | Compound N | Compound O |
|---|---|---|
| Resin (6) | 60 | 60 |
| Acrylic Syrup (P701;TM) | 40 | 40 |
| Zinc Stearate (lubricant) | 2.7 | 2.7 |
| Calcium Carbonate (filler) | 150.0 | 150.0 |
| Hydroquinone (10% in Ethylene Glycol) | 0.15 | 0.15 |
| Mg(OH)$_2$ | 1.18 | .59 |
| Polyisocyanate (MDI) | 1.14 | 1.14 |
| Mg(OH)$_2$ % of Stoichiometric (COOH) | 142% | 71% |
| Isocyanate % Stoichiometric (OH) | 36% | 36% |
| Viscosity at 30° C. | $40 \times 10^6$ | $12.0 \times 10^6$ |
| Viscosity at 120° C. | $.33 \times 10^6$ | $.31 \times 10^6$ |
| RATIO $\frac{\text{Viscosity at 30° C}}{\text{Viscosity at 120° C}} =$ | 121 | 39 |

Note:
If Mg(OH)$_2$ level is high, even in the presence of 36% of stoichiometric of isocyanate for OH, one obtains a poor viscosity index in ratio of viscosity at 30° C/ viscosity at 120° C.

In the light of these experiments, there is an upper limit for MgO or Mg(OH)$_2$ of approximately 75% of stoichiometric for COOH and a lower limit of isocyanate of 30% of stoichiometric for OH, although the upper limit for isocyanate can be 105% of stoichiometric for OH. The presence of MgO or Mg(OH)$_2$ appears to suppress the tendency towards foaming at the higher levels of isocyanate.

EXAMPLE VII

| | As taught by prior art Compound P | Compound Q |
|---|---|---|
| Resin (6) | 58.2 | 58.2 |
| Acrylic Syrup (P-701;TM) | 41.8 | 41.8 |
| Calcium Stearate (lubricant) | 3.2 | 3.2 |
| Calcium Carbonate (filler) | 170 | 170 |
| Hydroquinone (10% in Ethylene Glycol) | .15 | .15 |
| Mg(OH)$_2$ | 1.36 | .68 |
| Polyisocyanate (MDI) | — | 1.13 |
| Mg(OH)$_2$% of Stoichiometric (COOH) | 164% | 82% |
| Isocyanate % Stoichiometric (OH) | — | 36% |
| Viscosity at 30° C. | $11 \times 10^6$ | $9.6 \times 10^6$ |
| Viscosity at 120° C. | $.136 \times 10^6$ | $.150 \times 10^6$ |
| RATIO $\frac{\text{Viscosity at 30° C.}}{\text{Viscosity at 120° C.}} =$ | 83.3 | 64.0 |

Neither of the foregoing matrices P and Q were satisfactory. The first contained no MDI and the second contained excessive Mg(OH)$_2$. As will be noted, the Viscosity Indices for both matrices was excessively high.

If the metallic oxide or hydroxide is present at the upper level of its range, i.e., near 75%, and polyisocyanate is present near the lower level of its range, i.e., 36%, a substantial improvement in viscosity index is obtained.

If the metallic oxide or hydroxide level is lower, i.e., 40–50% of the stoichiometric for COOH, and the polyisocyanate level is higher, i.e., 50–70% of the stoichiometric for OH, very good and reproducible viscosity indices are attained.

At high isocyanate levels, e.g., 100% or so, and low levels of metallic oxide or hydroxide, i.e. 30–35%, the advantages of the invention are realized, but not to the same extent as within the preferred ranges.

EXAMPLE VIII

Resin (4) was evaluated using a conventional thickening agent (MgO) as compared to the dual thickening system of the invention. The maturation was allowed to proceed for seven days at 35° C. Compared to Example III Compound G, also a dual thickened system, the amount of MgO was reduced to the lower limit of this invention, and the isocyanate was raised to the upper range.

| | Compound R | Compound S |
|---|---|---|
| Resin (4) | 58.2 | 58.2 |
| Acrylic Syrup (P-701;TM) | 41.8 | 41.8 |
| Zinc Stearate (lubricant) | 2.6 | 2.6 |
| Calcium Carbonate (filler) | 170 | 170 |
| Hydroquinone (10% in Ethylene Glycol) | 0.15 | 0.15 |

-continued

|  | Compound R | Compound S |
|---|---|---|
| MgO | 0.810 | 0.184 |
| Polyisocyanate (Isonate 143L;TM) | — | 13.75 |
| MgO % of Stoichiometric (COOH) | 142% | 32% |
| Isocyanate % Stoichiometric (OH) | — | 78% |
| Viscosity at 30° C. | $102 \times 10^6$ | $85 \times 10^6$ |
| Viscosity at 120° C. | $.3 \times 10^6$ | $10 \times 10^6$ |
| RATIO $\frac{\text{Viscosity at 30° C.}}{\text{Viscosity at 120° C}}$ = | 340 | 8.5 |

As the metallic oxide level is reduced and isocyanate level raised, we observe no major improvement in the Ratio viscosity at 30° C/viscosity at 100° C; but incipient foaming is observed. Further decrease in MgO level results in undesirable foaming during maturation. Further increase in isocyanate levels at this MgO level results in increased foaming, and hardness of matrices without further improvement in viscosity index.

EXAMPLE IX

Resin (6) (Marco G13021;TM) was further evaluated using MgO as sole conventional thickening agent as compared with the sole thickening system of the present invention. Compounds T and U are both clear unfilled matrices, upon which the relevant viscosity measurements were taken. Resin (6) is as previously defined in Example V.

|  | Compound T | Compound U |
|---|---|---|
| Resin (6) | 100 | 100 |
| Zinc Stearate (lubricant) | 2.7 | 2.7 |
| Hydroquinone (10% in Ethylene Glycol) | .15 | .15 |
| MgO (Mod-M;TM) | 2.8 | .6 |
| Polyisocyanate (Isonate 143L) | — | 4.4 |
| MgO % of Stoichiometric (COOH) | 164% | 35.1% |
| Isocyanate % of Stoichiometric (OH) | — | 72.2% |
| Viscosity at 30° C. | 50.0 | 14.0 |
| Viscosity at 120° C. | 0.25 | 3.4 |
| RATIO $\frac{\text{Viscosity at 30° C.}}{\text{Viscosity at 120° C}}$ = | 200 | 4.1 |

As will be seen from the foregoing, Compound U, which employed the dual thickening system of the present invention, was very superior as to viscosity index.

EXAMPLE X

The foregoing matrices from Example I - Compound C; Example II - Compound E; Example III - Compound G; Example IV - Compound I; Example V - Compounds K and M; Example VI - Compound O; Example VIII - Compound S; and Example IX - Compound U are employed in the production of filled molding compounds, the hydroquinone (used in the matrices as an inhibitor so that no A-type polymerization occurs due to heat alone) being replaced by one percent by weight of a free-radical initiator. Peroxide free-radical initiators are generally most suitable. In this case, one percent by weight of t-butylperbenzoate, based upon the weight of resin, is employed. The matrices with added catalyst are accordingly admixed with fiberglass as the fiber in amounts up to seventy percent and as low as twenty percent, and even as low as five to ten percent when bulk molding compositions are prepared. The amounts of fiber range from about five to about twenty-five percent for bulk molding compositions and from about ten to about seventy weight percent for sheet molding compositions.

Molding by the application of heat and pressure in the usual manner to these molding compositions thickened with the dual thickening system shows that the fibers are adequately wet out and that viscosity decrease does not become excessive during the molding stage, and produces superior molded products, having no evidence of the voids, porosity, cracking, or other surface irregularities which characterize molded products produced from molding compositions utilizing conventional thickening systems which undergo too great a viscosity drop upon application of heat and pressure during the molding process. The glass distribution, in the molded products produced according to this invention, is moreover excellent, there being no evidence of the poor fiber distribution commonly experienced with molding compositions employing metallic oxides or hydroxides as sole thickeners.

EXAMPLE XI

The foregoing matrices from Example 1 - Compound C; Example II - Compound E; Example III, Compound G; Example IV - Compound I; Example V - Compounds K and M; Example VI - Compound O; Example VIII - Compound S; and Example IX - Compound U are employed in the production of filled molding compounds, the hydroquinone (used in the matrices as an inhibitor so that no A-type polymerization occurs due to heat alone) being replaced by one percent by weight of a free-radical initiator. Peroxide free-radical initiators are generally most suitable. In this case, one percent by weight of t-butylperbenzoate, based upon the weight of resin, is employed. The matrices with added catalyst are accordingly admixed with asbestos or calcium silicate (Wollastonite;TM) as the filler in amounts up to eighty-five percent and as low as fifty percent when bulk molding compositions are prepared.

Molding by the application of heat and pressure in the usual manner to these molding compositions thickened with the dual thickening system shows that the fillers are adequately wet out and that viscosity decrease does not become excessive during the molding stage, and produces superior molded products, having no evidence of the voids, porosity, cracking, or other surface irregularities which characterize molded products produced from molding compositions utilizing conventional thickening systems which undergo too great a viscosity drop upon application of heat and pressuring during the molding process. The distribution of filler in the molded products produced according to this invention is moreover excellent, there being no evidence of the poor filler distribution commonly experienced with molding compositions employing metallic oxides or hydroxides as sole thickeners.

It is to be understood that the invention is not to be limited to the exact details of operation or exact compounds, compositions, methods, or procedures shown and described, as obvious modifications and equivalents will be apparent to one skilled in the art.

We claim:

1. A maturated moldable thermosetting resin-containing composition for molding under pressure having a filler selected from the group consisting of (a) reinforcing fiber, (b) inert filler, and (c) a combination of both (a) and (b), dispersed therein, in which the curable resin binder consists essentially of the reaction product, in intimate contact with said filler, of A. an unsaturated polyester resin having (1) a ratio of hydroxyl groups to carboxyl groups between about 5.7 and 0.8 and (2) an acid number of at least 14 and (3) an average molecular weight between about 800 and 5,000, and B. (1) an organic polyisocyanate in an amount sufficient to react with at least thirty percent but not more than one hundred five percent of the hydroxyl groups present, and B. (2) a metallic oxide or hydroxide selected from the group consisting of calcium and magnesium oxides and hydroxides in an amount sufficient to react with at least thirty percent but not more than seventy-five percent of the carboxyl groups present, said reaction product containing dispersed therein C. an aliphatically-unsaturated monomer, D. a free radical polymerization catalyst, and E. an internal mold release agent, said binder comprising at least about eight weight percent of said composition.

2. The molding composition of claim 1 including both (a) reinforcing fiber and (b) inert filler dispersed therein.

3. The molding composition of claim 1 wherein said resin (A) has an acid number of at least 14 and a hydroxyl number of at least 14.

4. The molding composition of claim 1, wherein said resin (A) has an acid number between about 14 and about 70.

5. The molding composition of claim 1, wherein said resin (A) has an acid number between about 14 and about seventy and a hydroxyl number between about 14 and about one hundred twenty.

6. The molding composition of claim 1, wherein said reinforcing fiber (a) is present in an amount of about five to about twenty-five weight percent for bulk molding compositions and about ten to about seventy weight percent for sheet molding compositions.

7. The molding composition of claim 1, wherein said reinforcing fiber (a) is present in an amount of about twenty-five to seventy percent by weight.

8. The molding composition of claim 6, wherein said reinforcing fiber (a) is fiberglass.

9. The molding composition of claim 1, wherein said inert filler (b) is present in an amount of about fifty to eighty-five percent by weight for bulk molding compositions.

10. The molding composition of claim 1, wherein said resin (A) has a molecular weight of about 900 to 3,500.

11. The molding composition of claim 1, wherein said polyisocyanate (B)(1) is 4,4'-diphenyl methane diisocyanate (MDI).

12. The molding composition of claim 1, wherein said metallic hydroxide is magnesium hydroxide.

13. The molding composition of claim 1, wherein said polyisocyanate (B)(1) is a mixture of MDI and its trifunctional cyclic adduct containing carbodiimide linkages.

14. The molding composition of claim 1, wherein said metallic oxide is magnesium oxide.

15. The molding composition of claim 1, wherein said composition includes (F) a low-shrink additive consisting essentially of a thermoplastic polymer which is soluble in monomer (C), said low-shrink additive being present in an amount of about ten to fifty-five parts by weight per one hundred parts of resin (A).

16. The molding composition of claim 1, wherein the aliphatically unsaturated monomer (C) is present in an amount to give 0.5 to 2.5 moles of monomer unsaturation per mole of unsaturation in resin (A).

17. The molding composition of claim 16, wherein the monomer (C) is styrene.

18. The molding composition of claim 1, wherein the catalyst (D) is present in an amount of at least 0.1 part per 100 parts of total resin (A) and monomer (C).

19. The molding composition of claim 1, wherein said binder is present in at least about ten weight percent of said composition.

20. The molding composition of claim 1, wherein said polyisocyanate (B)(1) is present in an amount sufficient to react with between about thirty and about ninety-five percent of the hydroxyl groups present and wherein said metallic oxide or metallic hydroxide (B)(2) is present in an amount sufficient to react with between about thirty and about seventy-five percent of the carboxyl groups present.

21. The molding composition of claim 1, wherein said polyisocyanate (B)(1) is present in an amount sufficient to react with between about fifty and about seventy percent of the hydroxyl groups present and wherein said metallic oxide or metallic hydroxide (B)(2) is present in an amount sufficient to react with between about forty and about sixty percent of the carboxyl groups present.

22. The method of producing a controllable rise in viscosity and an improved viscosity index as herein defined of an uncured polyester compound, said compound comprising: (A) an unsaturated polyester resin have (1) a ratio of hydroxyl groups to carboxyl groups between about 5.7 and 0.8 and (2) an acid number of at least 14 and (3) an average molecular weight between about 800 and 5,000; at least one (C) aliphatically-unsaturated monomer; and (D) a free radical polymerization catalyst, comprising the step of introducing into said polyester resin compound reaction mixture prior to curing (B)(1) an organic polyisocyanate in an amount sufficient to react with at least thirty percent but not more than one hundred five percent of the hydroxyl groups present, and (B)(2) a metallic oxide or hydroxide selected from the group consisting of calcium and magnesium oxides and hydroxides in an amount sufficient to react with at least thirty percent but not more than seventy-five percent of the carboxyl groups present.

23. In the preparation of a molding compound comprising (A) an unsaturated polyester resin having (1) a ratio of hydroxyl groups to carboxyl groups between about 5.7 and 0.8 and (2) an acid number of at least 14 and (3) an average molecular weight between about 800 and 5,000; (C) an aliphatically-unsaturated monomer; and (D) a free radical polymerization catalyst, the improvement comprising introducing into said polyester resin compound reaction mixture prior to curing (B)(1) an organic polyisocyanate in an amount sufficient to react with at least thirty percent but not more than one hundred five percent of the hydroxyl groups present, and (B)(2) a metallic oxide or hydroxide selected from the group consisting of calcium and magnesium oxides and hydroxides in an amount sufficient to react with at least thirty percent but not more than seventy-five percent of the carboxyl groups present, thereby to produce a controllable rise in viscosity of said molding compound and an improved viscosity index as herein defined.

24. The method of claim 22, wherein (B)(1) is introduced in an amount sufficient to react with at least thirty percent but not more than ninety-five percent of the hydroxyl groups present.

25. The method of claim 23, wherein (B)(1) is introduced in an amount sufficient to react with at least thirty percent but not more than ninety-five percent of the hydroxyl groups present.

26. A molded product made by the application of heat and pressure to the composition of claim 1.

27. A molded product made by the application of heat and pressure to the composition of claim 5.

28. A molded product made by the application of heat and pressure to the composition of claim 6.

29. A molded product made by the application of heat and pressure to the composition of claim 9.

30. A molded product made by the application of heat and pressure to the composition of claim 15.

31. A molded product made by the application of heat and pressure to the composition of claim 16.

32. A molded product made by the application of heat and pressure to the composition of claim 20.

33. A molded product made by the application of heat and pressure to the composition of claim 21.

* * * * *

UNITED STATES PATENT OFFICE
CERTIFICATE OF CORRECTION

Patent No. 4,067,845    Dated   Jan. 10, 1978

Inventor(s)   Joseph Norman Epel et al

It is certified that error appears in the above-identified patent and that said Letters Patent are hereby corrected as shown below:

Col. 17, line 24: "sole" should read --dual--

*Signed and Sealed this*

*Eighteenth* Day of *July 1978*

[SEAL]

Attest:

RUTH C. MASON
*Attesting Officer*

DONALD W. BANNER
*Commissioner of Patents and Trademarks*